US011913371B2

(12) United States Patent
Kobayashi et al.

(10) Patent No.: US 11,913,371 B2
(45) Date of Patent: Feb. 27, 2024

(54) AIR-LEADING TYPE STRATIFIED SCAVENGING TWO-STROKE INTERNAL COMBUSTION ENGINE, AND ENGINE WORKING MACHINE

(71) Applicant: YAMABIKO CORPORATION, Tokyo (JP)

(72) Inventors: Yuta Kobayashi, Tokyo (JP); Takahiro Yamazaki, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 0 days.

(21) Appl. No.: 17/765,843

(22) PCT Filed: Sep. 24, 2020

(86) PCT No.: PCT/JP2020/035976
§ 371 (c)(1),
(2) Date: Apr. 1, 2022

(87) PCT Pub. No.: WO2021/065660
PCT Pub. Date: Apr. 8, 2021

(65) Prior Publication Data

US 2022/0325659 A1 Oct. 13, 2022

(30) Foreign Application Priority Data

Oct. 4, 2019 (JP) ................................ 2019-183639

(51) Int. Cl.
*F02D 41/04* (2006.01)
*F02B 25/20* (2006.01)
*F02M 7/12* (2006.01)

(52) U.S. Cl.
CPC ............ *F02B 25/20* (2013.01); *F02D 41/042* (2013.01); *F02M 7/12* (2013.01); *F02D 2200/021* (2013.01); *F02D 2200/101* (2013.01)

(58) Field of Classification Search
CPC .... F02B 25/20; F02B 77/08; F02B 2075/025; F02B 25/22; F02D 41/042; F02D 41/107;
(Continued)

(56) References Cited

U.S. PATENT DOCUMENTS 6,857,402 B2 2/2005 Schlossarczyk et al.

FOREIGN PATENT DOCUMENTS

JP S6291664 A 4/1987
JP H02298636 * 12/1990 ............ F02D 41/02
(Continued)

OTHER PUBLICATIONS

International Search Report in PCT/JP2020/035976, dated Nov. 17, 2020, 7p.

*Primary Examiner* — Hai H Huynh
(74) *Attorney, Agent, or Firm* — HAUPTMAN HAM, LLP

(57) ABSTRACT

Provided is an air leading type stratified scavenging two-stroke internal combustion engine including an air passage configured to allow supply of air to a scavenging passage configured to allow communication between a crank chamber and a combustion chamber, at least one sensor configured to detect an operating condition of an engine, and a fuel valve configured to control fuel supply to the air passage based on detection performed by the at least one sensor. The fuel supply to the air passage is controlled by the fuel valve at times other than start and idling of the engine or at needed times in addition to the start or the idling of the engine.

10 Claims, 4 Drawing Sheets

(58) Field of Classification Search
CPC ......... F02D 2200/021; F02D 2200/101; F02D 2400/04; F02M 7/12
USPC ............................................ 123/73 C, 73 PP
See application file for complete search history.

(56) References Cited

FOREIGN PATENT DOCUMENTS

| | | | | | |
|---|---|---|---|---|---|
| JP | H8105313 | A | | 4/1996 | |
| JP | H911989 | A | | 1/1997 | |
| JP | H10151962 | A | | 6/1998 | |
| JP | 2002256977 | A | | 9/2002 | |
| JP | 3479095 | | * | 12/2003 | F02P 5/15 |
| JP | 3777917 | | * | 5/2006 | F02D 41/12 |
| JP | 200746612 | A | | 2/2007 | |
| JP | 4271890 | B2 | | 6/2009 | |
| JP | 6425240 | B2 | | 11/2018 | |
| JP | 6857402 | B2 | | 4/2021 | |

* cited by examiner

AIR-LEADING TYPE STRATIFIED SCAVENGING TWO-STROKE INTERNAL COMBUSTION ENGINE, AND ENGINE WORKING MACHINE

RELATED APPLICATIONS

The present application is a National Phase of International Application Number PCT/JP2020/035976, filed Sep. 24, 2020, and claims priority to Japanese Application number 2019-183639, filed Oct. 4, 2019.

TECHNICAL FIELD

This disclosure relates to an air leading type stratified scavenging two-stroke internal combustion engine and an engine-driven working machine using the internal combustion engine as a power source.

BACKGROUND ART

As described in Paragraph [0002] of Patent Literature 1, a two-stroke internal combustion engine that performs scavenging with an air-fuel mixture is often used in portable working machines such as brush cutters and chainsaws. This kind of two-stroke internal combustion engine includes a scavenging passage that allows communication between a crank chamber and a combustion chamber. An air-fuel mixture, which has been pre-compressed in the crank chamber, is introduced into the combustion chamber through the scavenging passage, and scavenging is performed with the air-fuel mixture.

Further, as described in Paragraph [0003] of patent literature 1, the two-stroke internal combustion engine has a commonly known problem, "air-fuel mixture (fresh) air blow-by". To solve this problem, an air leading type stratified scavenging two-stroke internal combustion engine has been proposed and already put into practical use (see Patent Literature 2).

In the air leading type stratified scavenging two-stroke internal combustion engine, the air-fuel mixture is supplied to the crank chamber through an intake port during an intake stroke in which a piston moves from a bottom dead center toward a top dead center. At the same time, air is supplied to the scavenging passage through an air passage. Next, when a scavenging port is opened during a combustion stroke and an exhaust stroke in which the piston moves down from the top dead center, the air in the scavenging passage is introduced into the combustion chamber before the air-fuel mixture in the crank chamber is introduced thereinto. As a result, a combustion exhaust gas is discharged from an exhaust port (scavenging is performed). Subsequently, the air-fuel mixture in the crank chamber is introduced into the combustion chamber. Thus, the air leading type stratified scavenging two-stroke internal combustion engine has an advantage in that the air-fuel mixture blow-by during scavenging is reduced.

Further, an air leading type stratified scavenging two-stroke internal combustion engine having an air duct and a fuel pipe is described in Patent Literature 3 (see, for example, FIG. 2A to FIG. 4C of Patent Literature 3). The air duct allows supply of an atmospheric air for pre-scavenging of the combustion chamber to the scavenging passage. The fuel pipe allows supply of a fuel from a carburetor to the air duct so as to smoothen start of the internal combustion engine. In an embodiment illustrated in FIG. 3 of Patent Literature 3, there is described an air-leading type stratified scavenging two-stroke internal combustion engine in which supply of the fuel from the fuel pipe to the air duct is controlled by a controller including various kinds of sensors.

Further, in Patent Literature 4, there is described an air leading type stratified scavenging two-stroke internal combustion engine including an auxiliary passage (corresponding to the air duct of Patent Literature 3) that is open to the scavenging passage. The fuel passage, which communicates with a fuel accumulating chamber, is open to the auxiliary passage. The amount of fuel supplied to the internal combustion engine via the auxiliary passage is controlled by at least one valve (see, for example, the drawings of Patent Literature 4).

CITATION LIST

Patent Literature

[PTL 1] JP 6425240 B
[PTL 2] U.S. Pat. No. 6,857,402 B
[PTL 3] JP 4271890 B
[PTL 4] JP 2007-46612 A

In the air leading type stratified scavenging two-stroke internal combustion engine described in Patent Literature 3, however, the fuel is supplied to the air duct for the purpose of simplifying the engine start to improve startability (see Paragraph [0003] of Patent Literature 3). Thus, the fuel is supplied to the air duct only at the time of engine start.

Further, in the air leading type stratified scavenging two-stroke internal combustion engine described in Patent Literature 4, the fuel is supplied to the auxiliary passage for the purpose of reducing the amount of fuel consumption during idling of the engine to decrease an exhaust gas value (see Paragraph [0005] of Patent Literature 4). Thus, in Patent Literature 4, there is only disclosed control of the amount of fuel supply to the auxiliary passage during idling.

Incidentally, in the air leading type stratified scavenging two-stroke internal combustion engine, air for pre-scavenging may lead to dilution of a fuel concentration or adversely affect responsiveness of the engine at a time of an accelerating or decelerating operation. Thus, the air leading type stratified scavenging two-stroke internal combustion engine has a disadvantage in poor readiness for an operating condition at times other than engine start and idling.

DISCLOSURE OF INVENTION

The present invention has been made in view of the circumstances described above, and has an object to provide an air leading type stratified scavenging two-stroke internal combustion engine having improved readiness for an operating condition at times other than engine start and idling and an engine-driven working machine including the internal combustion engine.

In order to solve the problem described above, according the present invention, there is provided an air leading type stratified scavenging two-stroke internal combustion engine, including: an air passage configured to allow supply of air to a scavenging passage configured to allow communication between a crank chamber and a combustion chamber; at least one sensor configured to detect an operating condition of the engine; and a fuel valve configured to control fuel supply to the air passage based on detection performed by the at least one sensor, wherein the fuel supply to the air passage is controlled by the fuel valve at times other than start and idling of the engine or at needed times in addition to the start or the idling of the engine.

According to the present invention, in the air leading type stratified scavenging two-stroke internal combustion engine, the at least one sensor includes any one of a sensor configured to estimate a temperature of the engine, a sensor configured to estimate an accelerating operation of the engine, which is performed by an operator, and a sensor configured to estimate a decelerating operation of the engine, which is performed by the operator.

According to the present invention, in the air leading type stratified scavenging two-stroke internal combustion engine, the at least one sensor comprises a rotation speed sensor configured to detect a rotation speed of the engine.

According to the present invention, in the air leading type stratified scavenging two-stroke internal combustion engine, the sensor configured to estimate the temperature of the engine comprises a temperature sensor configured to directly detect a temperature.

According to the present invention, in the air leading type stratified scavenging two-stroke internal combustion engine, the temperature sensor is mounted to a cylinder.

According to the present invention, the air leading type stratified scavenging two-stroke internal combustion engine further includes a control configured to stop the engine immediately after detection of a predetermined high temperature of the engine.

According to the present invention, the air-leading type stratified scavenging two-stroke internal combustion engine further includes a piston configured to slidably reciprocate inside a cylinder coupled to the crank chamber, the piston having a peripheral surface with piston grooves configured to bring the air passage and the scavenging passage into communication with each other at predetermined timing.

According to the present invention, the air leading type stratified scavenging two-stroke internal combustion engine further includes an air-fuel mixture passage communicating with the crank chamber. The fuel valve is installed in a component obtained by integrally forming the air passage and the air-fuel mixture passage.

According to the present invention, in the air leading type stratified scavenging two-stroke internal combustion engine, the fuel valve is installed in an intake pipe being separate from a carburetor.

According to the present invention, in the air leading type stratified scavenging two-stroke internal combustion engine, the fuel valve is installed in a carburetor.

According to the present invention, there is provided an engine-driven working machine, including the air leading type stratified scavenging two-stroke internal combustion engine as a power source.

According to the present invention, the fuel is supplied to the air passage in accordance with the operating condition of the engine as needed at times other than the start and the idling of the engine or the start or the idling of the engine. When the fuel is supplied to the air passage, the fuel flows from the scavenging passage directly into the combustion chamber. Thus, high responsiveness to combustion is achieved. Meanwhile, the fuel is not supplied to the air passage when the fuel is not needed. Thus, air, which is supplied from the air passage to the scavenging passage, first flows into the combustion chamber to perform scavenging. Thus, air-fuel mixture blow-by, which is a problem specific to a two-stroke internal combustion engine, is prevented.

According to the present invention, when the at least one sensor includes the sensor configured to estimate the temperature of the engine, the following actions and effects are obtained. Specifically, when the temperature of the engine, which is detected by the sensor, reaches a predetermined high temperature, the fuel is supplied to the air passage. This fuel directly cools a piston and a cylinder. Thus, the piston and the cylinder are readily and quickly cooled. Preferably, the fuel mixed with lubricating oil is used. In this case, lubrication between the piston and the cylinder is readily and quickly achieved. Further, preferably, when the temperature of the engine reaches the predetermined high temperature, the fuel is supplied to the air passage immediately before the engine is stopped. In this case, the piston and the cylinder are directly cooled. Thus, seizure of the piston and the cylinder is prevented.

Further, according the present invention, when the at least one sensor includes the sensor configured to estimate the accelerating operation, the following actions and effects are obtained. Specifically, when the accelerating operation of the engine, which is performed by the operator, is detected by the sensor, the fuel is supplied to the air passage. The fuel directly flows into the combustion chamber, resulting in high reactivity to combustion. Thus, acceleration is achieved in quick response to the accelerating operation of the engine, which is performed by the operator.

Still further, according to the present invention, when the at least one sensor includes the sensor configured to estimate the decelerating operation, the following actions and effects are obtained. Specifically, when the decelerating operation of the engine, which is performed by the operator, is detected, the fuel is supplied to the air passage or the fuel supply to the air passage is stopped. In the former case, the fuel is supplied under an air excessive state to instantaneously assist deceleration, achieving the deceleration in quick response to the decelerating operation of the engine, which is performed by the operator. In the latter case, the fuel supply is stopped under a fuel excessive state to instantaneously assist deceleration. Also in this case, the deceleration is achieved in quick response to the decelerating operation of the engine, which is performed by the operator.

According to the present invention, it is economical because an existing rotation speed sensor can be used.

According to the present invention, the temperature is directly detected by the temperature sensor. Thus, a high-temperature state, in which a failure is liable to occur in the piston or the cylinder, can be more accurately detected. Further, the rotation speed sensor and the temperature sensor are operated in cooperation with each other depending on the case. As a result, the high-temperature state, in which the piston and the cylinder are liable to be damaged, can be more accurately detected.

According to the present invention, the temperature is detected in the vicinity of the piston and the cylinder in which a failure may occur. Thus, the high-temperature state can be more quickly and accurately detected.

According to the present invention, the engine is stopped immediately after the detection of the predetermined high temperature. Thus, seizure of the piston and the cylinder is prevented.

According to the present invention, the fuel supplied to the air passage reaches the scavenging passage via the piston grooves. Specifically, the fuel is brought into direct contact with the peripheral surface of the piston together with air. Thus, cooling performance for the piston is improved.

According to the present invention, the air passage, the air-fuel mixture passage, and the fuel valve can be arranged compactly. Thus, such a configuration is particularly suitable when the engine of this disclosure is used as a power source for a small working machine.

According to the present invention, it is economical because an existing carburetor can be used without change.

According to the present invention, when the carburetor including the fuel valve is prepared in advance, faster and labor-saving assembly work for the engine is achieved. Further, a compact engine can be achieved by installing the fuel valve in a free space in the carburetor.

According to the present invention, the actions and effects of the present invention are obtained.

DESCRIPTION OF EMBODIMENTS

Now, with reference to the accompanying drawings, a description is given of the embodiments of the present invention.

An air leading type stratified scavenging two-stroke internal combustion engine (hereinafter simply referred to as "engine") according to the present invention is of air cooled type to be mainly mounted in a portable engine-driven working machine as a power source. Examples of a working machine in which the engine of the present invention is used include portable working machines such as a chainsaw, a brush cutter, a power cutter, a hedge-trimmer, and a power blower.

Figure 1:
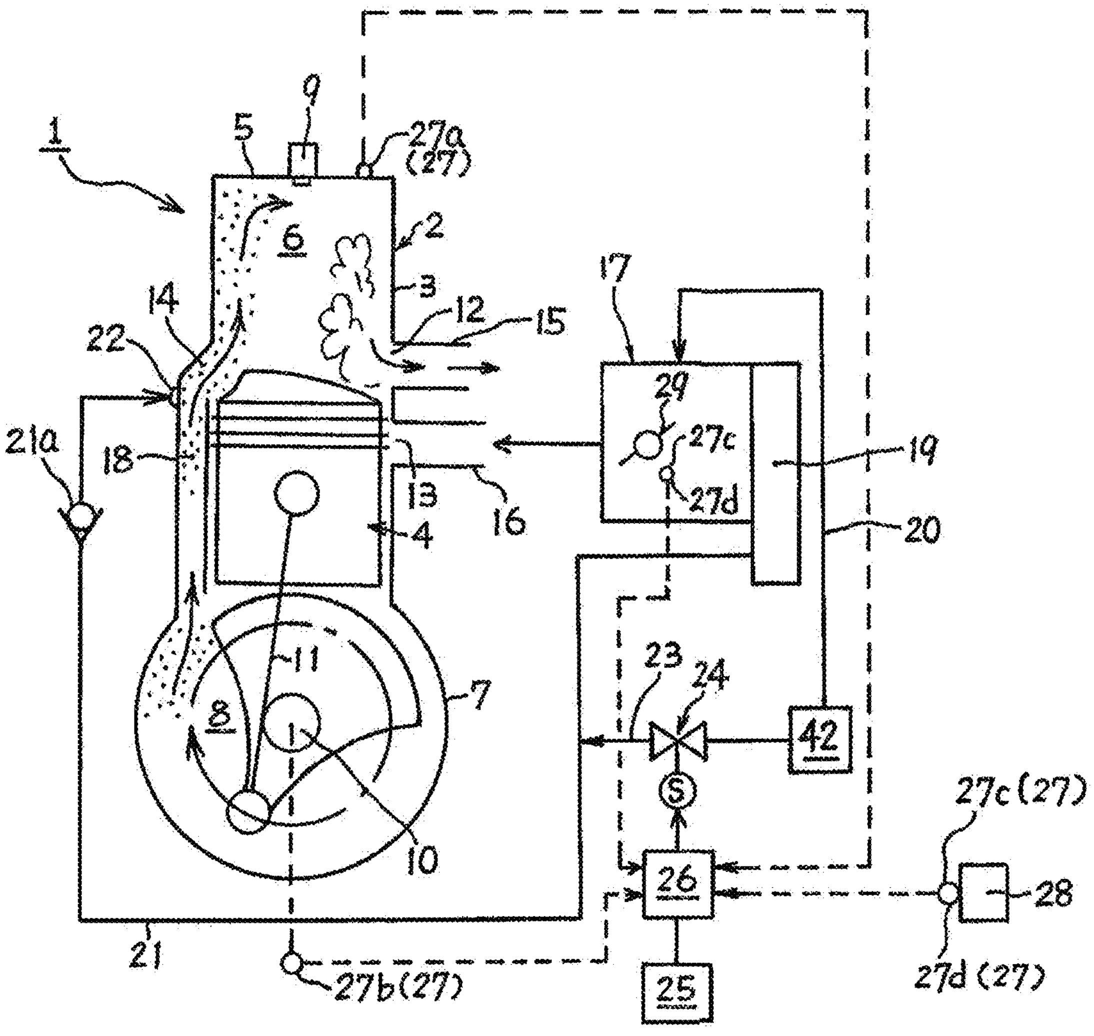
FIG. 1 is a schematic view of an air leading type stratified scavenging two-stroke internal combustion engine according to one embodiment of the present invention.

As illustrated in FIG. 1, an engine 1 according to one embodiment of the present invention includes a cylinder block 2 and a piston 4. The piston 4 slidably reciprocates inside a cylinder 3 forming the cylinder block 2. A cylinder head 5, which forms one end side of the cylinder block 2, and the piston 4 define a combustion chamber 6. A crankcase 7, which forms another end side of the cylinder block 2, and the piston 4 define a crank chamber 8. A spark plug 9 forming to an ignition device is firmly fixed to the cylinder head 5. The spark plug 9 projects into the combustion chamber 6. A crankshaft 10 is pivotably supported in the crankcase 7. The crankshaft 10 and the piston 4 are coupled to each other with a connecting rod 11. Explosion in the combustion chamber 6 causes the piston 4 to slidably reciprocate inside the cylinder 3. The reciprocation of the piston 4 rotationally drives the crankshaft 10 through the connecting rod 11, and a rotational driving force is output to an output shaft (not shown) connected to the crankshaft 10.

An exhaust port 12, an intake port 13, and at least one scavenging port 14 are open on an inner wall of the cylinder 3. These ports 12, 13, and 14 are controlled to be opened and closed at publicly known predetermined timing through the reciprocation of the piston 4. The exhaust port 12 communicates with a muffler (not shown) via an exhaust pipe 15. The intake port 13 communicates with a carburetor 17 via an intake pipe 16. The scavenging port 14 communicates with the crank chamber 8 via a scavenging passage 18. Although not shown, the intake port 13 may be formed in the crankcase 7 in place of the cylinder 3. In this case, a check valve is disposed. The check valve is configured to prevent backflow of an air-fuel mixture in the crank chamber 8 toward the intake pipe 16 when the piston 4 moves down.

Air, which has been purified by an air cleaner 19, is mixed with a fuel in the carburetor 17 to generate an air-fuel mixture. The air-fuel mixture is sucked into the crank chamber 8 through the intake pipe 16 and the intake port 13. The air-fuel mixture is generated in the carburetor 17, and is sucked into the crank chamber 8 during an intake stroke in which a pressure in the crank chamber 8 becomes negative. A type of the carburetor 17 is not limited and as the carburetor 17 suitable for a portable engine-driven working machine including a machine body with a posture frequently changed during work, it is preferred that a diaphragm carburetor having a commonly known configuration be used. The carburetor 17 is coupled to a fuel tank 42 through a main fuel passage 20.

The engine 1 includes an air passage 21 that allows supply of air to the scavenging passage 18 so as to achieve air leading type stratified scavenging. A check valve 21*a* configured to prevent backflow of air from the scavenging passage 18 is disposed in the air passage 21. The air passage 21 is coupled to an air intake port 22 formed at an end of the scavenging passage 18, which is located on a side closer to the scavenging port 14. The air passage 21 guides the air that has been purified by the air cleaner 19 to the scavenging passage 18. The air is sucked from the air intake port 22 into the scavenging passage 18 through the air passage 21 during the intake stroke in which the pressure of the crank chamber 8 becomes negative. During a scavenging stroke, the air flows from the scavenging port 14 into the cylinder 3 before the air-fuel mixture in the crank chamber 8 flows thereinto, and an exhaust gas in the combustion chamber 6 is discharged from the exhaust port 12.

The engine 1 includes a fuel supply passage 23 configured to allow supply of the fuel to the air passage 21. The fuel supply passage 23 is coupled to the fuel tank 42. A fuel valve 24 is disposed in the fuel supply passage 23. When the fuel valve 24 is opened and the pressure in the crank chamber 8 becomes negative during the intake stroke, the air and the fuel pass through the air passage 21 and are sucked into the scavenging passage 18 through the air intake port 22. The fuel valve 24 is electrically controllable. For example, a solenoid valve (electromagnetic valve) is used as the fuel valve 24. For example, a battery mounted in an engine-driven working machine may be used as a power supply 25 for the fuel valve 24.

The fuel valve 24 is controlled to be opened and closed by a controller 26 including a microcomputer. A result of estimation performed by at least one sensor 27 (27*a* to 27*d*) configured to detect an operating condition of the engine 1 is input to the controller 26. The controller 26 controls fuel supply to the air passage 21 with the fuel valve 24 at times other than start and idling of the engine 1 or at needed times in addition to the start or the idling of the engine 1 based on the detection performed by the sensor 27.

At least any one of a sensor 27*a*, a sensor 27*b*, a sensor 27*b*, and a sensor 27*d* may be used as the at least one sensor 27. The sensor 27*a* is configured to detect and estimate a temperature of the engine 1. The sensor 27*b* is configured to detect and estimate a rotation speed (rotation number) of the engine 1. The sensor 27*c* is configured to detect and estimate an accelerating operation of the engine 1, which is performed by an operator. The sensor 27*d* is configured to detect and estimate a decelerating operation of the engine 1, which is performed by the operator.

When the rotation speed sensor 27*b* configured to detect the rotation speed of the engine 1 is used in addition to the temperature sensor 27*a* configured to detect the temperature of the engine 1 so that the temperature sensor 27*a* and the rotation speed sensor 27*b* are operated in cooperation with each other, a high-temperature state, in which the piston 4 and the cylinder 3 are liable to be damaged by seizure, can be more accurately detected.

It is preferred that the sensor 27*a* configured to estimate the temperature be the temperature sensor 27*a* configured to directly detect the temperature. It is more preferred that the temperature sensor 27*a* directly detect a temperature of the cylinder 3 and thus be mounted to the cylinder 3. It is preferred that a specific position on the cylinder 3 at which the temperature sensor 27*a* is mounted be the cylinder head 5 that is likely to have the highest temperature.

The sensor 27*c* configured to detect the accelerating operation and the sensor 27*d* configured to detect the decelerating operation both detect, for example, a position or an angular position of an output operating member (such as a throttle trigger or a throttle lever) 28 of the engine-driven working machine or a throttle valve 29 of the carburetor 17.

Figures 2A, 2B, 2C, 2D:
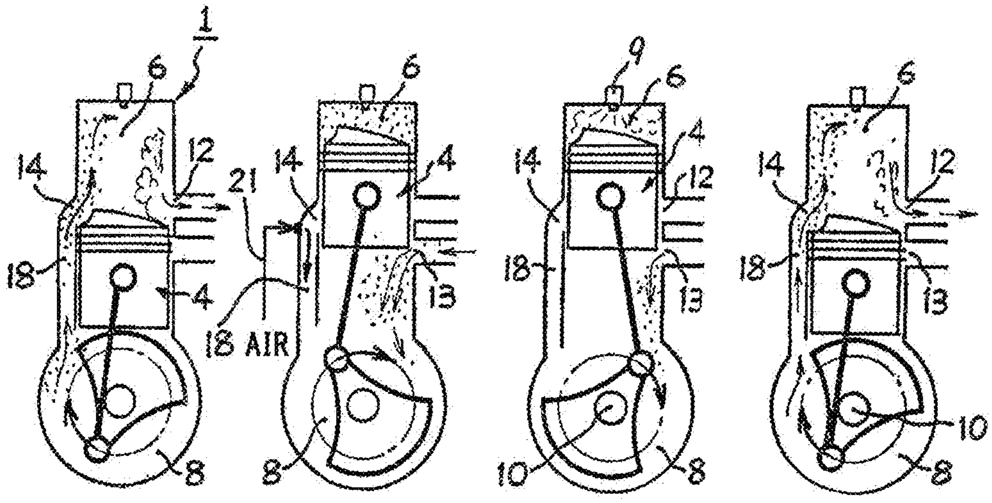
FIGS. 2A to 2D are explanatory views for illustrating working strokes of the engine of FIG. 1.

Next, an operation of the engine 1 of FIG. 1 is described with reference to FIGS. 2A to 2D. In FIGS. 2A to 2D, FIG. 2A is an explanatory view for illustrating an operation at a time of scavenging, FIG. 2B is an explanatory view for illustrating an operation at a time of intake and compression, FIG. 2C is an explanatory view for illustrating an operation at a time of explosion, and FIG. 2D is an explanatory view for illustrating an operation at a time of exhaust.

As illustrated in FIG. 2A and FIG. 2B, when the scavenging port 14 is closed by the piston 4 in a process in which the piston 4 is moving up from a bottom dead center, the pressure in the crank chamber 8 becomes negative due to the upward movement of the piston 4. As a result, leading air for scavenging is sucked through the air passage 21 into the scavenging passage 18. Subsequently, simultaneously with opening of the intake port 13, the air-fuel mixture is sucked into the crank chamber 8. The air-fuel mixture is compressed in the combustion chamber 6 until the piston 4 reaches a top dead center.

As illustrated in FIG. 2C, when the piston 4 reaches the top dead center, ignition is performed by the spark plug 9. The ignition causes explosion of the air-fuel mixture in the combustion chamber 6 to push down the piston 4 to the bottom dead center. As a result, the crankshaft 10 is rotated to generate power. When the intake port 13 is closed with the piston 4 that is moving down, the air-fuel mixture in the crank chamber 8 is pre-compressed.

As illustrated in FIG. 2D, when the exhaust port 12 is opened as a result of downward movement of the piston 4, exhaust of a combustion gas is started. Subsequently, the scavenging port 14 is opened to allow the pre-compressed air-fuel mixture in the crank chamber 8 to be sent into the combustion chamber 6 through the scavenging passage 18. At this time, the leading air for scavenging in the scavenging passage 18 flows into the combustion chamber 6 before the air-fuel mixture in the crank chamber 8 flows thereinto, and pushes the combustion gas to the exhaust port 12. Thus, blow-by of the air-fuel mixture at the time of scavenging is reduced. The piston 4, which has reached the bottom dead center, moves toward the top dead center again through the rotation of the crankshaft 10. After that, the same actions are repeated.

In the above-mentioned working strokes of the engine 1, when the fuel valve 24 is actuated to be opened by the controller 26 based on the detection performed by the sensor 27, the fuel is supplied to the air passage 21 as needed in accordance with the operating condition of the engine 1. When the fuel is supplied to the air passage 21, the fuel directly flows into the combustion chamber 6 through the scavenging passage 18. Thus, high responsiveness to combustion is achieved. Meanwhile, the fuel is not supplied to the air passage 21 when the fuel is not needed. Therefore, the air, which has been supplied through the air passage 21 to the scavenging passage 18, first flows into the combustion chamber 6 to perform scavenging. Thus, air-fuel mixture blow-by, which is a problem specific to a two-stroke internal combustion engine, is prevented.

When the temperature sensor 27*a* detects that the temperature of the engine 1 has reached a predetermined high temperature, the fuel valve 24 is actuated to be opened by the controller 26 to allow the supply of the fuel to the air passage 21. The fuel directly cools the piston 4 and the cylinder 3. Thus, the piston 4 and the cylinder 3 are readily and quickly cooled. This cooling prevents seizure of the engine 1.

Further, a fuel for a two-stroke internal combustion engine is mixed gasoline and lubricating oil. Thus, when the fuel (mixed fuel) is supplied to the air passage 21, lubrication between the piston 4 and the cylinder 3 is readily and quickly achieved with the lubricating oil contained in the fuel. The lubrication also prevents the seizure of the engine 1.

By increasing the amount of fuel supplied to the air passage 21, it is possible to make the air-fuel mixture in the combustion chamber 6 excessive enough to stop the engine. In this way, when the temperature becomes high to bring about a risk of seizure of the engine 1, the engine 1 can be forced to be stopped immediately. The engine 1 is forced to be stopped immediately before occurrence of seizure of the engine 1. Accordingly, the seizure of the engine 1 can be prevented.

When the sensor 27*c* detects the accelerating operation of the engine 1, which is performed by the operator to increase a speed of the engine 1 to a predetermined value or higher, the fuel is supplied to the air passage 21. The fuel directly flows into the combustion chamber 6, and thus high responsiveness to the combustion is achieved. Accordingly, the acceleration in quick response to the accelerating operation of the engine 1, which is performed by the operator, is achieved.

When the sensor 27*d* detects the decelerating operation of the engine 1, which is performed by the operator to decrease the speed of the engine 1 to a predetermined value or lower, the fuel is supplied to the air passage 21 or the fuel supply to the air passage 21 is stopped. In the former case, the fuel is supplied under an air excessive state to instantaneously assist the deceleration, achieving the deceleration in quick response to the decelerating operation of the engine 1, which is performed by the operator. In the latter case, the fuel supply is stopped under a fuel excessive state to instantaneously assist the deceleration, also achieving the deceleration in quick response to the decelerating operation of the engine 1, which is performed by the operator.

Next, a modification example of FIG. 1 is described with reference to FIG. 3 and FIGS. 4A to 4C. In the following description, components which are the same as or equivalent to those in the example of FIG. 1 are denoted by the same reference symbols as those in FIG. 1, and overlapping description thereof is omitted.

Figure 3:
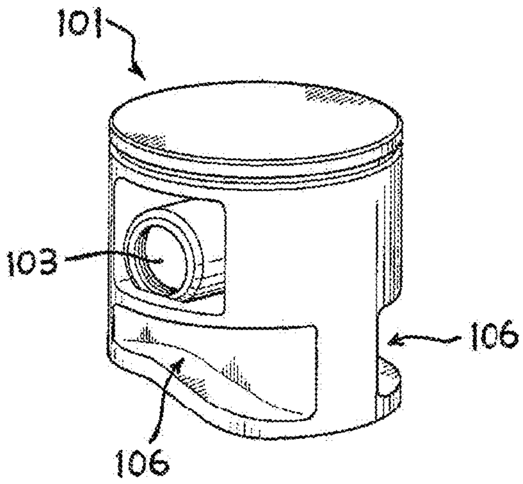
FIG. 3 is a perspective view for illustrating a modification example of a piston forming the engine of FIG. 1.

A piston 101 of FIG. 3 has a peripheral surface with piston grooves 106. An air passage 102 (see FIGS. 4A to 4C) and a scavenging passage 104 (see FIGS. 4A to 4C) are brought into communication with each other through the piston grooves 106 at predetermined timing. In FIG. 3, the piston 101 has a piston pin hole 103. The piston 101 is coupled to the connecting rod 11 (see FIG. 1) with a piston pin (not shown) inserted into the piston pin hole 103.

Figure 4A:
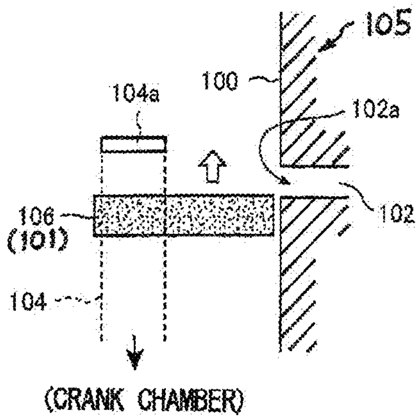
FIGS. 4A to 4C are explanatory views for illustrating inflow of air from an air passage into a scavenging passage while the piston of FIG. 3 is moving upward.
Figure 4B:
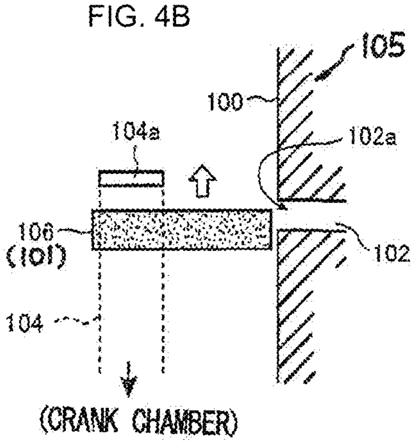
Figure 4C:
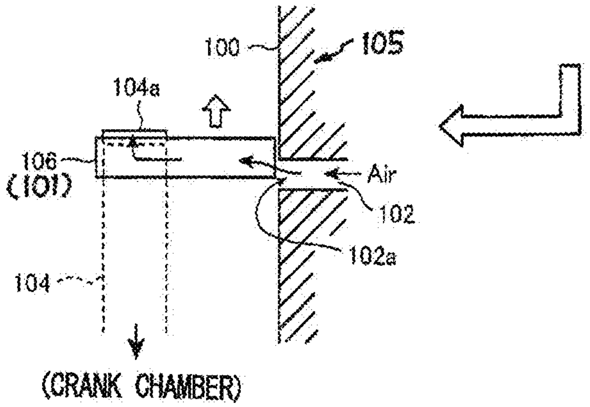

A cylinder wall 100 of a cylinder 105, which is used together with the piston 101 of FIG. 3, has an air port 102*a* in addition to an intake port and an exhaust port (both not shown) and at least one scavenging port 104*a*, as illustrated in FIGS. 4A to 4C. The air port 102*a* communicates with the air passage 102. The air passage 102 has the same configuration as that of the air passage 21 of FIG. 1. Further, the scavenging port 104*a* communicates with the crank chamber 8 (see FIG. 1) via the scavenging passage 104. The air port 102*a* and the scavenging port 104*a* are both opened and closed by the piston 101.

FIG. 4A to FIG. 4C are views for illustrating, in time series, a relationship among the piston grooves 106, the air port 102*a*, and the scavenging port 104*a* in a process in which the piston 101 is moving upward. FIG. 4B is a view for illustrating a state in which the piston 101 has moved to a higher level than that in FIG. 4A, and FIG. 4C is a view for illustrating a state in which the piston 101 has moved to a higher level than that in FIG. 4B. In FIGS. 4A to 4C, an illustration of an outline of the piston 101 is omitted to avoid complication of drawing lines, and only the piston grooves 106 extending in a circumferential direction of the piston 101 are illustrated in a simplified manner.

As illustrated in FIG. 4A, a blow-back gas generated at the time of previous scavenging remains in the piston grooves 106 during a period from start of upward movement of the piston 101 from the bottom dead center to a time immediately before the piston grooves 106 reaches the air port 102*a*. The blow-back gas contains an air-fuel mixture component. The blow-back gas remaining in the piston grooves 106 is indicated by dots.

FIG. 4B, which corresponds to a state in which the piston 101 has moved to a higher level, is a view for illustrating a state in which the piston grooves 106 are brought into communication with the air port 102*a*. Under a state illustrated in FIG. 4B, the piston grooves 106 are not in communication with the scavenging port 104*a*. Thus, even though the piston grooves 106 are in communication with the air port 102*a*, flow of air from the air port 102*a* toward the piston grooves 106 does not occur at this time.

Under a state illustrated in FIG. 4C in which the piston 101 has further moved to a higher level, the piston grooves 106 are in communication with both of the air port 102*a* and the scavenging port 104*a*. Under the state illustrated in FIG. 4C, air is supplied to the scavenging passage 104 via the piston grooves 106.

In the engine including a combination of the piston 101 and the cylinder 105 illustrated in FIG. 3 and FIGS. 4A to 4C, the fuel supplied to the air passage 102 by the controller 26 based on the detection of the sensor 27 at an appropriate time reaches the scavenging passage 104 via the piston grooves 106. Specifically, the fuel is brought into direct contact with the peripheral surface of the piston 101 together with air. Thus, an effect of further improving cooling performance for the piston 101 is obtained. Further, a mixed fuel containing lubricating oil is used as the fuel. Thus, lubricating performance between the piston 101 and the cylinder 105 is further improved.

Figure 5:
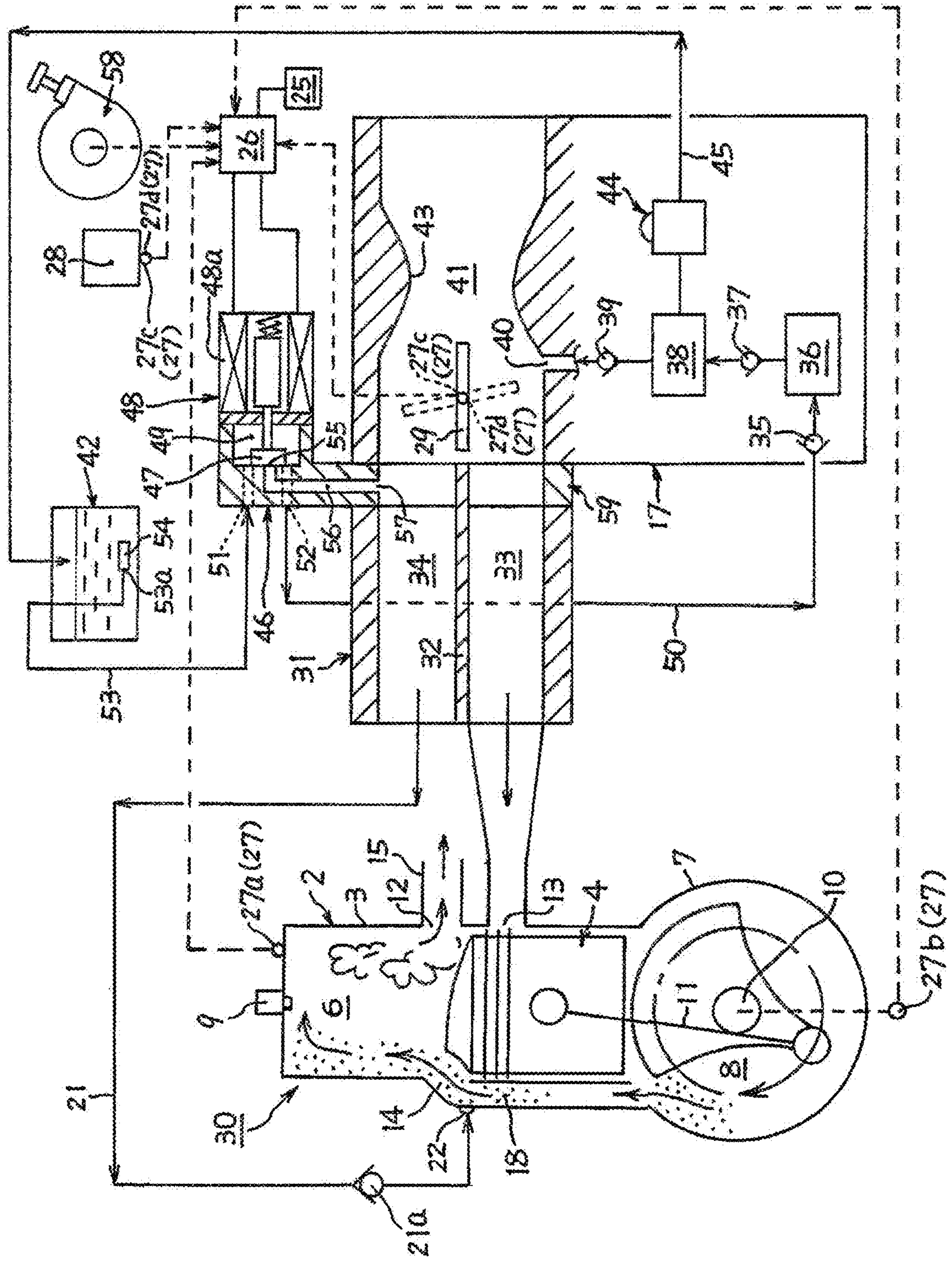
FIG. 5 is a schematic view of an air leading type stratified scavenging two-stroke internal combustion engine according to another embodiment of the present invention.

Next, an engine 30 according to another embodiment of this disclosure is described with reference to FIG. 5. The engine 30 of FIG. 5 includes a fuel valve 24 of FIG. 1, which additionally has a starting fuel supply function. In other words, the engine 30 of FIG. 5 includes, for example, a starting fuel supply valve described in Japanese Patent Application Laid-open No. Hei 6-159146, which additionally has a function as the fuel valve 24 of FIG. 1. Thus, the engine 30 of FIG. 5 has the same actions and effects as those obtained by the engine 1 of FIG. 1, and has an additional specific effect provided by the starting fuel supply function. In FIG. 5, members or elements which are the same as or equivalent to those of FIG. 1 are denoted by the same reference symbols, and overlapping description thereof is omitted.

As for the engine 30 of FIG. 5, an intake pipe 31 arranged between a cylinder block 2 and a carburetor 17 is divided into an air-fuel mixture passage 33 on a lower side and an air passage 34 on an upper side. The air-fuel mixture passage 33 communicates with an intake port 13 of a cylinder 3 similarly to the intake pipe 16 of FIG. 1. The air passage 34 communicates with an air intake port 22 at an end of a scavenging passage 18, which is located on a side closer to a scavenging port 14, via a check valve 21*a* similarly to the air passage 21 of FIG. 1.

The carburetor 17 includes a fuel pump 36, a fuel chamber 38, and a main fuel discharge port 40. The fuel pump 36 is connected to a fuel tank 42 of an engine-driven working machine via a check valve 35. The fuel chamber 38 is connected to the fuel pump 36 via a check valve 37. The main fuel discharge port 40 is connected to the fuel chamber 38 via a check valve 39. The main fuel discharge port 40 is open to an intake passage 41 of the carburetor 17.

The fuel pump 36 is preferably a pulse-control diaphragm pump that is driven by a pressure pulse generated in a crank chamber 8 of the engine 30. The fuel pump 36 pumps up a fuel from the fuel tank 42, and supplies the fuel to the fuel chamber 38. A decrease in pressure in the intake passage 41, which is caused by a venturi portion 43, causes the fuel in the fuel chamber 38 to be sucked into the intake passage 41 through the main fuel discharge port 40. When an output operating member (such as a throttle trigger or a throttle lever) of the engine-driven working machine is operated by an operator, an opening degree of a throttle valve 29 disposed in the intake passage 41 is adjusted. As a result, an engine output in accordance with the opening degree of the throttle valve 29 is obtained.

The carburetor 17 also arranges a manual pump 44 disposed therein. The manual pump 44 is configured to pump up the fuel in the fuel tank 42 into the fuel chamber 38 before start of the engine 30. The fuel pump 44 is provided to a return flow passage 45 extending from the fuel chamber 38 to the fuel tank 42. When the operator operates the manual pump 44 before the start of the engine 30, the fuel in the fuel tank 42 is supplied to the fuel chamber 38. As a result, the fuel chamber 38 is filled with the fuel. At the same time, a surplus fuel and a gas such as air bubbles in the fuel chamber 38 are pushed into the fuel tank 42. The manual pump 44 may be provided integrally with the carburetor 17, or may be separate from the carburetor 17.

A fuel supply device 46 for the engine 30 of FIG. 5 includes a fuel valve 48 and a valve chamber 49. The fuel valve 48 is configured to automatically add a fuel to air having passed through the carburetor 17 and the valve chamber 49 is configured to accommodate a valve element 47 of the fuel valve 48. An operation of the manual pump 44 allows the fuel in the fuel tank 42 to move to the carburetor 17 through the valve chamber 49.

In the embodiment illustrated in FIG. 5, the valve chamber 49 is disposed in a middle of a suction flow passage 50 extending from the fuel tank 42 to the fuel pump 36 of the carburetor 17. Thus, when the fuel pump 36 is actuated, the fuel in the fuel tank 42 moves to the fuel chamber 38 of the carburetor 17 through the valve chamber 49. Further, in the embodiment illustrated in FIG. 5, the valve chamber 49 is located above the intake passage 41 of the carburetor 17 under a state in which the engine-driven working machine including the engine 30 is stored. A fuel inlet 51 and a fuel outlet 52 communicate with the valve chamber 49. The fuel inlet 51 communicates with the fuel tank 42 through a suction pipe 53, and the fuel outlet 52 communicates with the fuel pump 36 via the check valve 35. A suction-side end 53*a* of the suction pipe 53 is located in a lower part of the fuel tank 42. A filter 54 configured to prevent suction of dust is provided to the suction-side end 53*a*.

An orifice (valve seat or flow passage hole) 55 is open to the valve chamber 49. The orifice 55 communicates with the air passage 34 of the intake pipe 31 through a fuel discharge passage 56 and a fuel discharge port 57. The fuel discharge port 57 is open to the air passage 34 of the intake pipe 31. The fuel valve 48 configured to open and close the orifice 55 is controlled by a controller 26 including a microcomputer similarly to the fuel valve 24 of FIG. 1. A result of detection performed by at least one sensor 27 (27*a* to 27*d*) configured to detect an operating condition of the engine 30 is input to the controller 26. Based on the detection of the sensor 27, the controller 26 controls fuel supply to the air passage 34 with the fuel valve 48 at times other than start and idling of the engine 30 or at needed times in addition to the start or the idling of the engine 30.

The fuel valve 48 is electrically controllable. For example, a solenoid valve (electromagnetic valve) is used as the fuel valve 48. For example, a battery mounted in an engine-driven working machine may be used as the power supply 25 for the fuel valve 48.

As described in Japanese Patent Application Laid-open No. Hei 6-159146, actuation of the fuel valve 48 at the time of engine start can be controlled by an output signal from a primary coil of a flywheel magneto that is rotated through an operation of a recoil starter 58. The recoil starter 58 is configured to start the engine 30. More specifically, when an operator operates the recoil starter 58, an electromagnetic coil 48*a* of the fuel valve 48 is excited by the controller 26 based on an output signal from the primary coil of the flywheel magneto to thereby actuate the fuel valve 48 to be opened. Then, when the engine 30 reaches idling speed, the electromagnetic coil 48*a* of the fuel valve 48 is degaussed by the controller 26 based on the output signal from the primary coil of the flywheel magneto to thereby close the fuel valve 48.

When starting the engine 30 having the configuration, the operator first operates the manual pump 44 to supply the fuel in the fuel tank 42 to the fuel chamber 38. As a result, the fuel in the fuel tank 42 moves to the fuel pump 36 and the fuel chamber 38 through the valve chamber 49 so that the fuel chamber 38 is filled with the fuel. At the same time, a surplus fuel and a gas such as air bubbles in the fuel chamber 38 are pushed to the fuel tank 42 through the return flow passage 45. As a result, the engine 30 is smoothly and reliably started.

Subsequently, the operator turns on a start switch for the engine 30, and performs a pulling operation on the recoil starter 58. Then, a piston 4 reciprocates inside a cylinder block 2 through intermediation of a crankshaft 10 and a connecting rod 11. In synchronization with the reciprocation of the piston 4, ignition is performed by a spark plug 9. The reciprocation of the piston 4 inside the cylinder block 2 generates a negative pressure in the intake passage 41 of the carburetor 17 to cause the fuel in the fuel chamber 38 to be sucked into the intake passage 41 through the main fuel discharge port 40. As a result, an air-fuel mixture is generated.

Simultaneously, the pulling operation performed by the operator on the recoil starter 58 actuates the fuel valve 48 to be opened. Thus, the orifice 55 is opened, and the fuel in the valve chamber 49 is sucked into the air passage 34 through the fuel discharge passage 56 by the negative pressure in the air passage 34. As a result, a starting fuel is added to air flowing through the air passage 34, and the air and the starting fuel are supplied to the scavenging passage 18. When the scavenging port 14 is opened, the starting fuel, which has been sucked into the scavenging passage 18, flows into the combustion chamber 6. As a result, the engine 30 is smoothly started. When the engine 30 reaches the idling speed, the fuel valve 48 is automatically closed by the controller 26.

In the embodiment of FIG. 5, the operation of the manual pump 44 causes the fuel in the fuel tank 42 to move into the fuel chamber 38 of the carburetor 17 through the valve chamber 49 before the start of the engine 30. The fuel, which has moved into the valve chamber 49, is brought into contact with the valve element 47 of the fuel valve 48 to lubricate the valve element 47. As a result, sticking of the valve element 47 to the orifice 55 is eliminated before the start of the engine 30. Thus, the fuel valve 48 is reliably actuated at a time of start of the engine 30, and startability of the engine 30 is improved.

In the example of FIG. 5, as a preferred embodiment, the fuel valve 48 and the valve chamber 49 are provided to an adapter 59 being separate from the carburetor 17. In this case, the adapter 59 may be disposed between the intake pipe 31 configured to connect the carburetor 17 to the cylinder block 2 and the carburetor 17. The adapter 59 includes the fuel discharge passage 56 that brings the valve chamber 49 and the air passage 34 of the intake pipe 31 into communication with each other when the fuel valve 48 is actuated to be opened. Further, when the partition 32 is provided to extend in the adapter 59, characteristics of the air leading type stratified scavenging two-stroke internal combustion engine are further improved.

As a preferred embodiment, the intake pipe 31 is preferably formed of a contractible bellows, without limitation. By using a contractible bellows, when the adapter is disposed between an existing carburetor 17 without the fuel valve 48 or the valve chamber 49 and the intake pipe 31, a thickness dimension of the adapter 59 can be absorbed through contractibility of the intake pipe 31. Thus, an increase in size of a structure that covers the carburetor 17 and the cylinder block 2 can be prevented.

As a suitable example of an arrangement mode of the fuel valve 48, the fuel valve 48 can be installed in the intake pipe 31, which is a component obtained by integrally forming the air passage 34 and the air-fuel mixture passage 33. This configuration enables the air passage 34, the air-fuel mixture passage 33, and the fuel valve 48 to be arranged compactly which is particularly suitable as a power source for a small working machine.

As another suitable example of the arrangement mode of the fuel valve 48, the fuel valve 48 may be installed in the intake pipe 31 being separate from the carburetor 17. In this way, the existing carburetor 17 can be used without modification, which is economical.

As a further suitable example of the arrangement mode of the fuel valve 48, the fuel valve 48 may be installed in the carburetor 17. In this case, when the carburetor 17 including the fuel valve 48 is prepared in advance, there is an advantage in that faster and labor-saving assembly work for the engine 30 is achieved. Further, a compact engine 30 can be achieved by installing the fuel valve 48 in a free space inside the carburetor 17.

The embodiments of the present invention have been described in detail with reference to the drawings, but the present invention is not limited to those of the embodiments described above. For example, changes in design without departing from the scope of the present invention are encompassed in this disclosure. Further, technologies in the above-mentioned embodiments described above may be used in combination as long as there is no particular contradiction or problem in, for example, purpose and configuration.

The invention claimed is:

1. An air leading type stratified scavenging two-stroke internal combustion engine, comprising:

an air passage configured to allow supply of air to a scavenging passage configured to allow communication between a crank chamber and a combustion chamber;

at least one sensor configured to detect an operating condition of the engine; and a fuel valve configured to control fuel supply to the air passage based on detection performed by the at least one sensor, wherein the fuel supply to the air passage is controlled by the fuel valve at times other than start and idling of the engine or at needed times in addition to the start or the idling of the engine, and the at least one sensor includes any one of a sensor configured to estimate a temperature of the engine, a sensor configured to estimate an accelerating operation of the engine, which is performed by an operator, and a sensor configured to estimate a decelerating operation of the engine, which is performed by the operator.

2. The air leading type stratified scavenging two-stroke internal combustion engine according to claim 1, wherein the at least one sensor comprises a rotation speed sensor configured to detect a rotation speed of the engine.

3. The air leading type stratified scavenging two-stroke internal combustion engine according to claim 1, wherein the sensor configured to estimate the temperature of the engine comprises a temperature sensor configured to directly detect a temperature.

4. The air leading type stratified scavenging two-stroke internal combustion engine according to claim 3, wherein the temperature sensor is mounted to a cylinder.

5. The air leading type stratified scavenging two-stroke internal combustion engine according to claim 1, further comprising a control configured to stop the engine immediately after detection of a predetermined high temperature of the engine.

6. The air leading type stratified scavenging two-stroke internal combustion engine according to claim 1, further comprising a piston configured to slidably reciprocate inside a cylinder coupled to the crank chamber, the piston having a peripheral surface with piston grooves configured to bring the air passage and the scavenging passage into communication with each other at predetermined timing.

7. The air leading type stratified scavenging two-stroke internal combustion engine according to claim 1, further comprising an air-fuel mixture passage communicating with the crank chamber, wherein the fuel valve is installed in a component obtained by integrally forming the air passage and the air-fuel mixture passage.

8. The air leading type stratified scavenging two-stroke internal combustion engine according to claim 1, wherein the fuel valve is installed in an intake pipe being separate from a carburetor.

9. The air leading type stratified scavenging two-stroke internal combustion engine according to claim 1, wherein the fuel valve is installed in a carburetor.

10. An engine-driven working machine, comprising an air leading type stratified scavenging two-stroke internal combustion engine as a power source, wherein the air leading type stratified scavenging two-stroke internal combustion engine, comprising:

an air passage configured to allow supply of air to a scavenging passage configured to allow communication between a crank chamber and a combustion chamber;

at least one sensor configured to detect an operating condition of the engine; and a fuel valve configured to control fuel supply to the air passage based on detection performed by the at least one sensor, wherein the fuel supply to the air passage is controlled by the fuel valve at times other than start and idling of the engine or at needed times in addition to the start or the idling of the engine, and the at least one sensor includes any one of a sensor configured to estimate a temperature of the engine, a sensor configured to estimate an accelerating operation of the engine, which is performed by an operator, and a sensor configured to estimate a decelerating operation of the engine, which is performed by the operator.

* * * * *